US012591075B2

(12) United States Patent
Takahashi

(10) Patent No.: US 12,591,075 B2
(45) Date of Patent: Mar. 31, 2026

(54) RADIATION DETECTOR, METHOD FOR MANUFACTURING RADIATION DETECTOR, AND IMAGING METHOD

(71) Applicant: Sharp Display Technology Corporation, Kameyama City (JP)

(72) Inventor: Kozo Takahashi, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 483 days.

(21) Appl. No.: 18/227,987

(22) Filed: Jul. 31, 2023

(65) Prior Publication Data

US 2024/0045088 A1 Feb. 8, 2024

(30) Foreign Application Priority Data

Aug. 2, 2022 (JP) ................................. 2022-123533

(51) Int. Cl.
*G01T 7/00* (2006.01)
*G01T 1/20* (2006.01)

(52) U.S. Cl.
CPC .......... *G01T 7/005* (2013.01); *G01T 1/20181* (2020.05); *G01T 1/20184* (2020.05)

(58) Field of Classification Search
CPC .. G01T 1/20181; G01T 1/20184; G01T 7/005
See application file for complete search history.

(56) References Cited

U.S. PATENT DOCUMENTS

2018/0107317 A1 4/2018 Tanaka et al.
2021/0186453 A1* 6/2021 Lalena ................. A61B 6/4283

FOREIGN PATENT DOCUMENTS

JP 2018-063666 A 4/2018

* cited by examiner

*Primary Examiner* — Mark R Gaworecki
(74) *Attorney, Agent, or Firm* — ScienBiziP, P.C.

(57) ABSTRACT

A radiation detector according to an embodiment of the disclosure includes a substrate, a plurality of pixels arranged on the substrate, the plurality of pixels each including a switching element and a photoelectric conversion element, a scintillator arranged to cover the photoelectric conversion element of each of the plurality of pixels, and a storage device configured to store inspection image data acquired by irradiating the plurality of pixels with visible light before forming the scintillator or a calibration parameter based on the inspection image data.

14 Claims, 14 Drawing Sheets

RADIATION

RADIATION DETECTOR, METHOD FOR MANUFACTURING RADIATION DETECTOR, AND IMAGING METHOD

CROSS-REFERENCE TO RELATED APPLICATIONS

This application claims the benefit of priority to Japanese Patent Application Number 2022-123533 filed on Aug. 2, 2022. The entire contents of the above-identified application are hereby incorporated by reference.

BACKGROUND

Technical Field

The disclosure relates to a radiation detector and an imaging method.

With the development of image processing techniques, various image diagnostic apparatuses are widely used also in the medical field. In a diagnostic apparatus using radiation such as X-rays, a radiation Flat Panel Detector (FPD) that can directly convert radiation transmitted through a body or an object into digital data is used. For example, JP 2018-63666 A discloses such an FPD.

Summary

The radiation detector used for such image diagnosis is required to acquire a more accurate image. An object of the disclosure is to provide a radiation detector that can more accurately acquire an image of a subject, a method for manufacturing the radiation detector, and an imaging method.

A radiation detector according to an embodiment of the disclosure includes a substrate, a plurality of pixels arranged on the substrate, the plurality of pixels each including a switching element and a photoelectric conversion element, a scintillator arranged to cover the photoelectric conversion element of each of the plurality of pixels, and a storage device storing inspection image data acquired by irradiating the plurality of pixels with visible light before forming the scintillator or a calibration parameter based on the inspection image data.

According to the disclosure, a radiation detector that can more accurately acquire an image of a subject, a method for manufacturing the radiation detector, and an imaging method can be provided.

BRIEF DESCRIPTION OF DRAWINGS

The disclosure will be described with reference to the accompanying drawings, wherein like numbers reference like elements.

DESCRIPTION OF EMBODIMENTS

Figure 1:
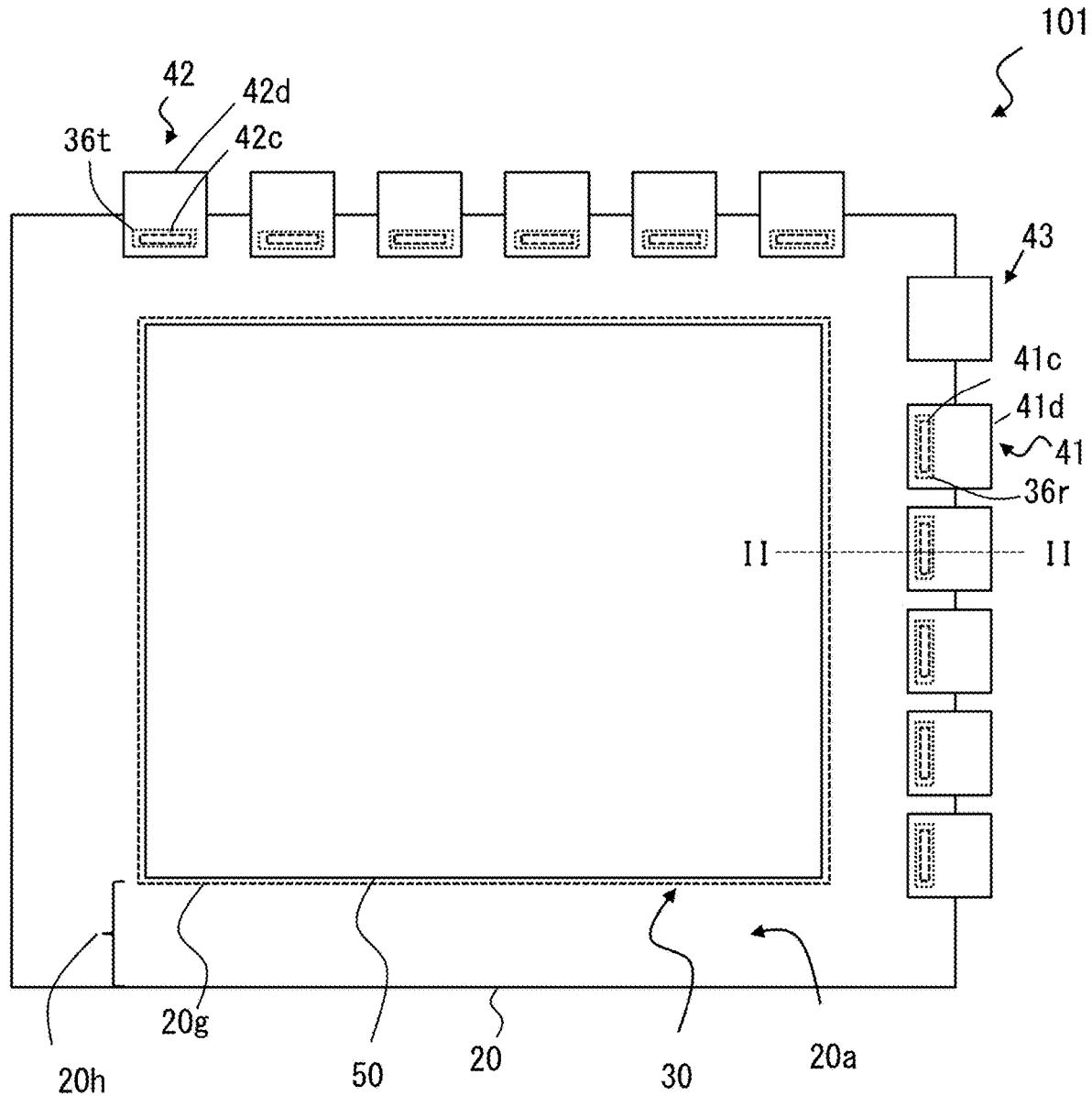
FIG. 1 is a schematic plan view illustrating an example of a radiation detector according to a first embodiment.

An FPD type radiation detector is used as a substitute for an X-ray film, and a subject is captured typically at an equal magnification with respect to an imaging surface of a radiation detector. Therefore, the imaging surface of the FPD type radiation detector is significantly larger than that of an image sensor for a digital camera. For example, the imaging surface of the FPD type radiation detector has a size of 10 inches×10 inches or greater.

It is not easy to form an insulating layer and a semiconductor layer with a uniform thickness and to make an exposure condition of photolithography and a temperature condition of heat treatment the same, over such a large area. Thus, differences occur in sensitivity between pixels due to variations in the film thickness of such various layers and variations in the manufacturing condition, and this may result in brightness unevenness in a radiation image to be captured. In view of such a problem, the inventor of the present application has conceived a novel radiation detector, a method for manufacturing the radiation detector, and an imaging method.

Embodiments of the disclosure will be described below with reference to the drawings. The disclosure is not limited to the following embodiments, and appropriate design changes can be made within a scope that satisfies the configuration of the disclosure. Further, in the description below, the same reference signs may be used in common among the different drawings for portions having the same or similar functions, and descriptions of repetitions thereof may be omitted. Further, the configurations described in the embodiments and the modified examples may be combined or modified as appropriate within a range that does not depart from the gist of the disclosure. For ease of explanation, in the drawings referenced below, configurations may be simplified or schematically illustrated, or a portion of the components may be omitted. Further, dimensional ratios between components illustrated in the drawings are not necessarily indicative of actual dimensional ratios.

First Embodiment

Structure of Radiation Detector 101

Figure 2:
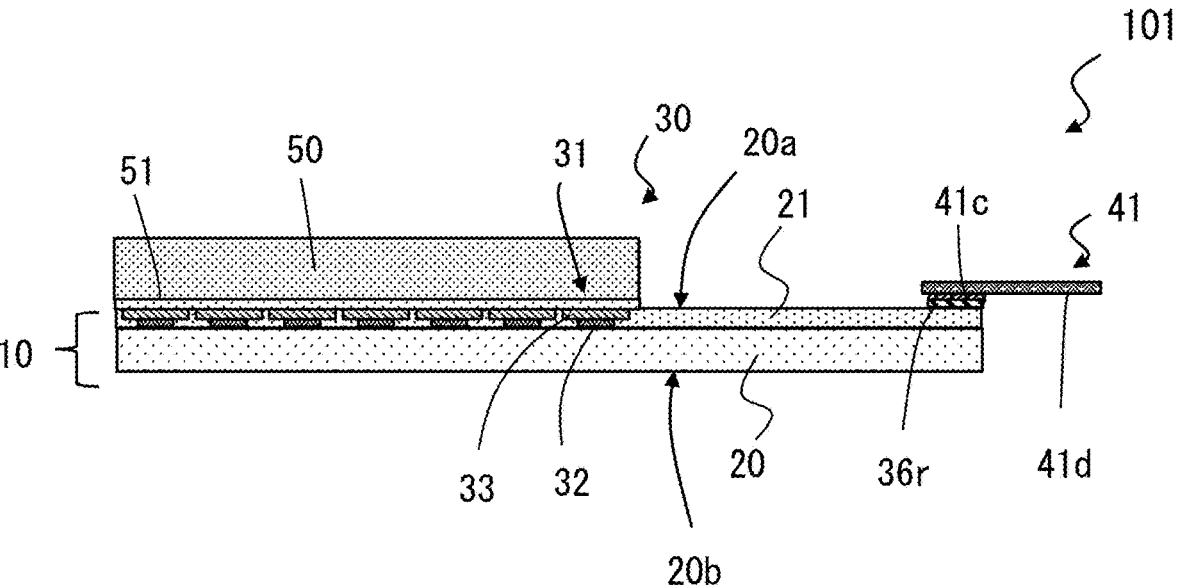
FIG. 2 is a schematic cross-sectional view of the radiation detector taken along a line II-II in FIG. 1.

A radiation detector according to the disclosure is used for an X-ray photographing apparatus using radioactive rays such as X-rays, or an X-ray FPD to be used for X-ray photographing, for example. FIG. 1 is a plan view of a radiation detector 101 according to the first embodiment, and FIG. 2 illustrates a cross section of the radiation detector 101 taken along a line II-II in FIG. 1.

The radiation detector 101 includes an active matrix substrate 10 (FIG. 2) and a scintillator 50. Additionally, the active matrix substrate 10 includes a substrate 20 and a pixel array 30 including a plurality of pixels. The pixel array 30 is formed on the substrate 20.

The substrate 20 includes a first main surface 20a and a second main surface 20b positioned at the opposite side to the first main surface 20a. The second main surface 20b is a radiation incident surface of the radiation detector 101. The first main surface 20a includes a pixel region 20g in which the pixel array 30 is arranged and a peripheral region 20h that is located outside the pixel region 20g and that surrounds the pixel region 20g.

The substrate 20 is preferably made of an insulating material that hardly absorbs radiation to be detected. For example, the substrate 20 may be a glass substrate to be used for a liquid crystal display panel.

Figure 3:
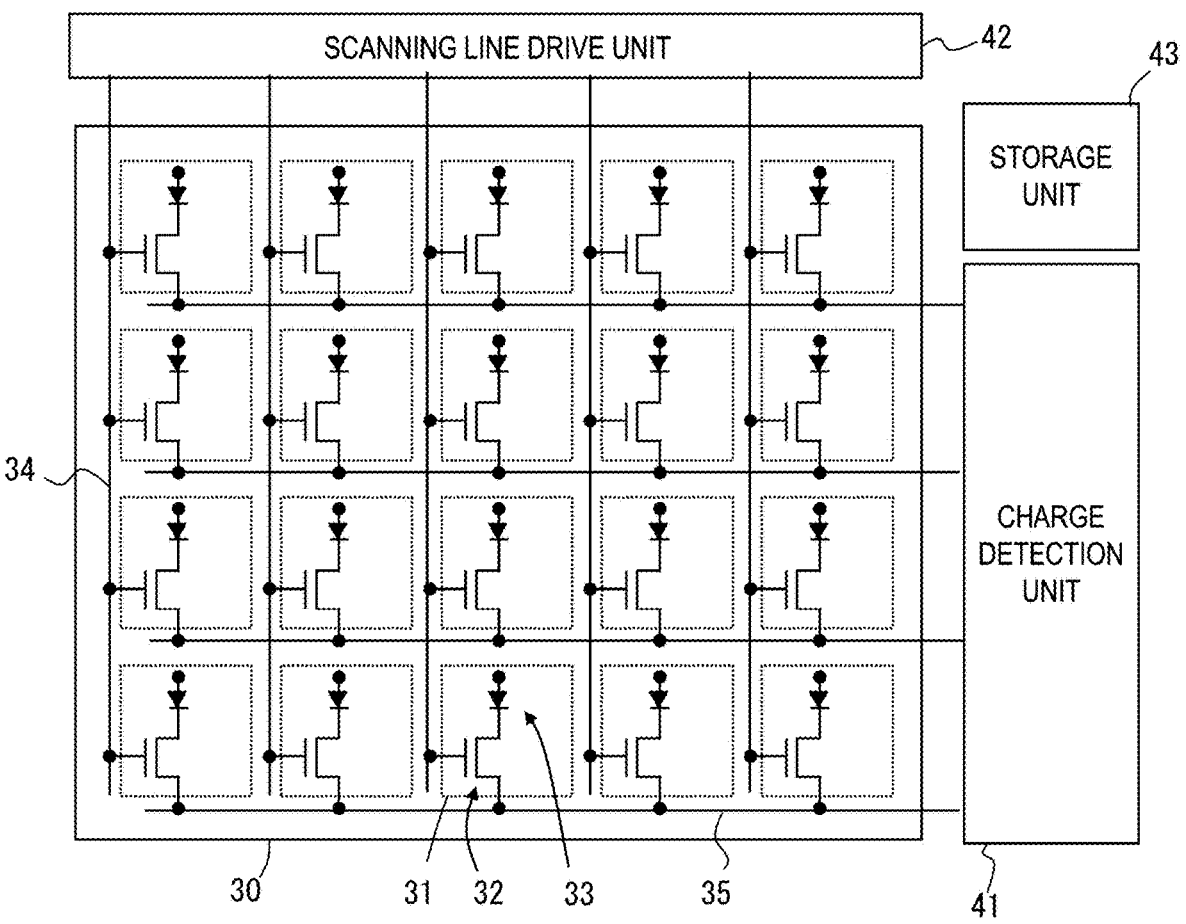
FIG. 3 is a schematic circuit diagram illustrating an example of a circuit configuration of a pixel array.

FIG. 3 is a schematic circuit diagram illustrating an example of a circuit configuration of the pixel array 30. The pixel array 30 includes a plurality of pixels 31 one-dimensionally or two-dimensionally arrayed. In the present embodiment, the plurality of pixels 31 are two-dimensionally arranged in the row direction and the column direction. Each of the pixels 31 includes a switching element and a photoelectric conversion element electrically connected to the switching element. The switching element is, for example, an active element such as an MIM element, a TFT or the like, and in the present embodiment, the pixel 31 includes a TFT 32. The TFT 32 includes, for example, an oxide semiconductor layer including at least one element selected from the group consisting of In, Ga, and Zn, or a Si-semiconductor layer. The oxide semiconductor layer and the Si semiconductor layer may have various types of crystallinity such as polycrystal, microcrystal, a c-axis orientation distribution or the like.

The photoelectric conversion element receives scintillation light emitted from a scintillator, which will be described later, and generates charges by photoelectric conversion. The photoelectric conversion element is, for example, an element including a semiconductor layer and having various structures that can separate a hole-electron pair generated by a photon incident on the semiconductor layer. In the present embodiment, the pixel 31 includes a photodiode 33. The photodiode 33 includes, for example, an i-type Si semiconductor layer, and a p-type Si semiconductor layer and an n-type Si semiconductor layer that sandwich the i-type Si semiconductor layer. The pixel 31 may further include an amplifier circuit that amplifies charges generated in the photodiode 33.

The pixel array 30 includes a plurality of scanning lines 34 and a plurality of data lines 35. For example, the gates of the TFTs 32 of a plurality of pixels 31 arranged in the column direction are connected to one scanning line 34. In addition, the sources of the TFTs 32 of the plurality of pixels 31 arranged in the row direction are connected to one data line 35.

In the pixel array 30, various insulating layers and interlayer insulating films are disposed between constituent elements that need to be electrically separated, such as the TFT 32, the photodiode 33, the scanning line 34, the data line 35 and the like. In FIG. 2, such insulating layers and interlayer insulating films are collectively illustrated as an insulator 21.

The scanning line 34 is electrically connected to a pad 36t disposed in the peripheral region 20h of the first main surface 20a. The data line 35 is electrically connected to a pad 36r disposed in the peripheral region 20h of the first main surface 20a.

The radiation detector 101 further includes a scanning line drive unit 42 and a charge detection unit 41 which are a driver IC of the pixel array 30, and a storage device 43. The scanning line drive unit 42 includes substrates 42d and terminals 42c individually provided on the substrates 42d, and drive circuits for sequentially selecting the plurality of scanning lines 34 are formed on the substrates 42d. When the terminals 42c are connected to the pad 36t, a portion including at least the terminals 42c of the substrate 42d is positioned in the peripheral region 20h and is supported by the substrate 20. The scanning line drive unit 42 is connected to the scanning lines 34 via the terminals 42c and the pad 36t, and is electrically connected to the TFTs 32 of the plurality of pixels 31. Although the scanning line drive unit 42 is divided into two or more substrates in the present embodiment, the scanning line drive unit 42 may be formed on one substrate.

Similarly, the charge detection unit 41 includes substrates 41d and terminals 41c individually provided on the substrates 41d, and charge detection circuits for receiving charges accumulated in the photodiodes 33 and converting the charges into electric signals are formed on the substrates 41d. When the terminals 41c are connected to the pad 36r, a portion including at least the terminals 41c of the substrate 41d is positioned in the peripheral region 20h and is supported by the substrate 20. The charge detection unit 41 is connected to the data lines 35 via the terminals 41c and the pad 36r, and is electrically connected to the TFTs 32 of the plurality of pixels 31. In the present embodiment, the charge detection unit 41 is divided into two or more substrates, but the charge detection unit 41 may be formed on one substrate.

The storage device 43 stores inspection image data for defect inspection of the pixels 31 performed on the active matrix substrate 10 or a calibration parameter based on such inspection image data. As will be described later, the defect inspection, that is, the quality of each of the pixels 31 is determined by irradiating the plurality of pixels 31 with visible light before forming the scintillators 50 in the pixel region 20g to acquire the inspection image data and analyzing the acquired inspection image data. A case where the calibration parameter is stored in the storage device 43 will be described in a second embodiment.

Such inspection image data is luminance data proportional to the charges accumulated in the photodiode 33 of each of the pixels 31. When one of the TFT 32 of the pixel 31 and the photodiode 33 does not operate correctly, the obtained luminance value is equal to or less than a predetermined value, and thus, the defect of the pixel is determined based on such a luminance value. On the other hand, such a luminance value of each pixel also would reflect variation in characteristics of each pixel 31. Therefore, the pixel data is stored in the storage device 43 and is utilized to suppress the brightness unevenness when a subject is imaged by radiation using the radiation detector 101.

The storage device 43 may be, for example, a nonvolatile memory such as an electrically erasable programmable read-only memory (EEPROM). The storage device 43 may be an independent IC different from the scanning line drive unit 42 and the charge detection unit 41, or may be incorporated in either the scanning line drive unit 42 or the charge detection unit 41.

The scintillator 50 emits scintillation light when radiation transmitted through a body or an object is incident thereon. The scintillator 50 covers the photodiodes 33 that are photoelectric conversion elements of the plurality of pixels 31. For example, the scintillator 50 has a sheet shape, and is bonded to the plurality of pixels 31 with an adhesive layer 51 such as an OCA interposed therebetween. The scintillator 50 may be a vapor deposition film.

The scintillator 50 is made of a material corresponding to radiation to be used. The radiation may be X-rays, α-rays, γ-rays, or the like. X-rays are widely used for a medical or industrial radiation FPD. As the scintillator 50 that detects X-rays, a single crystal or polycrystal material such as Thallium activated Cesium Iodide (Tl:CsI), Gadolinium OxySulfide (GOS) or the like can be used.

When radiation is detected by the radiation detector 101, radiation X transmitted through a body or an object is caused to be incident on the second main surface 20b side of the substrate 20. The radiation X transmits through the substrate 20 and the pixel array 30 formed on the first main surface 20a, and is incident on the scintillator 50 from the second main surface 50b adjacent to the photodiodes 33. The radiation X incident on the scintillator 50 excites a substance constituting the scintillator 50, and scintillation light is emitted from the scintillator 50. The photodiode 33 detects the generated scintillation light and generates charges by photoelectric conversion. The charges generated by the photodiode 33 in each pixel 31 are converted into an electric signal by the charge detection unit 41 in a reading order controlled by the scanning line drive unit 42. Since the radiation incident on the radiation detector 101 is partially attenuated by a subject such as a body or an object through which the radiation has been transmitted, the radiation has a two-dimensional intensity distribution, and an image based on the generated electric signals also has a two-dimensional distribution corresponding to an internal structure of the subject.

Method for Manufacturing Radiation Detector

Figure 4:
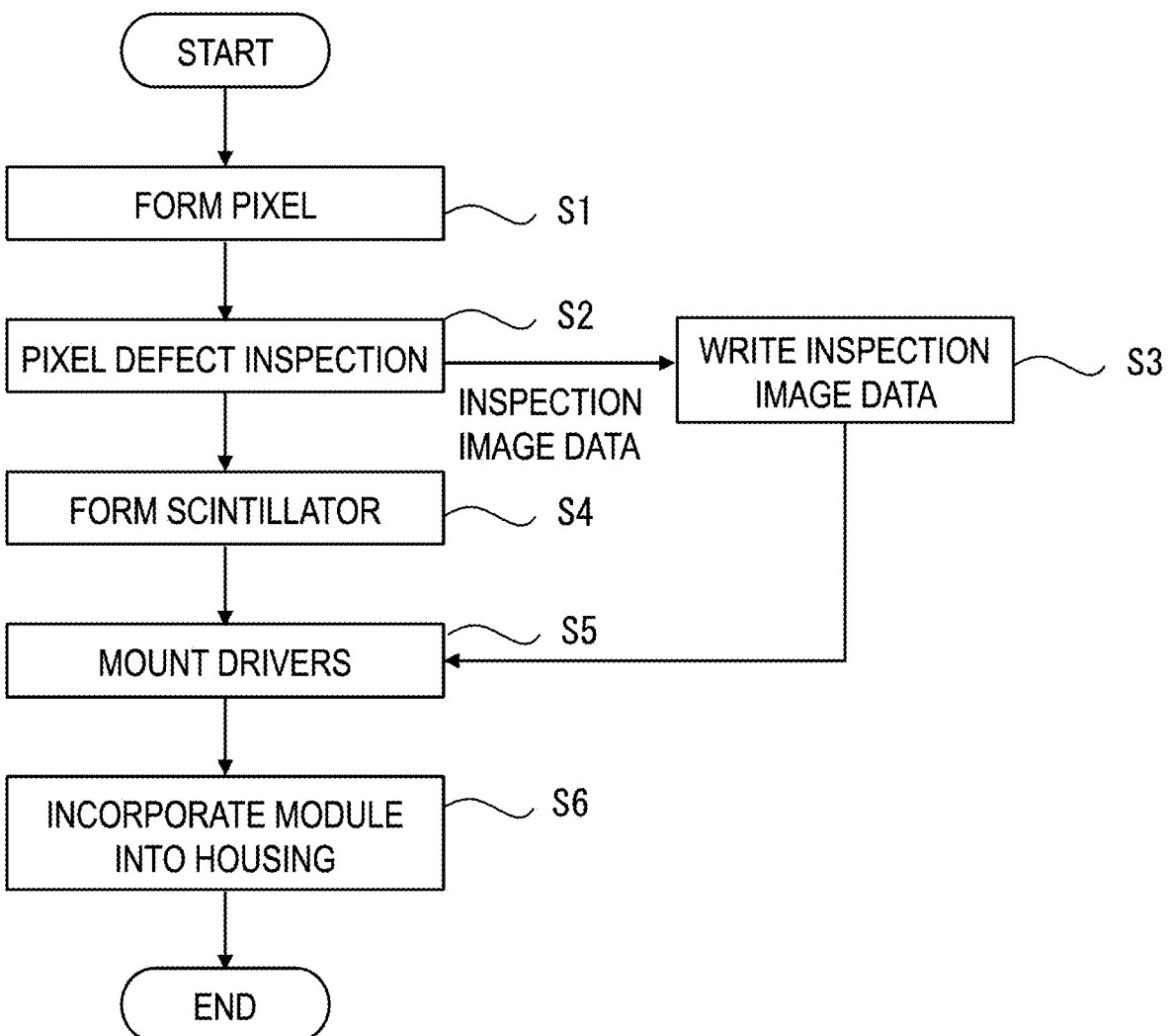
FIG. 4 is a flowchart illustrating a method for manufacturing the radiation detector.

Next, a method for manufacturing the radiation detector 101 will be described. FIG. 4 is a flowchart illustrating the method for manufacturing the radiation detector 101, and FIG. 5 is a schematic process cross-sectional view. The method for manufacturing the radiation detector 101 according to the first embodiment includes a step of forming a plurality of pixels (S1), a step of acquiring inspection image data (S2), a step of writing the image data into a storage device (S3), and a step of mounting the storage device on a substrate (S5). The method for manufacturing the radiation detector 101 according to the first embodiment may further include a step of forming scintillators (S4).

(A) A Step of Forming Plurality of Pixels (S1)

Figure 5A:
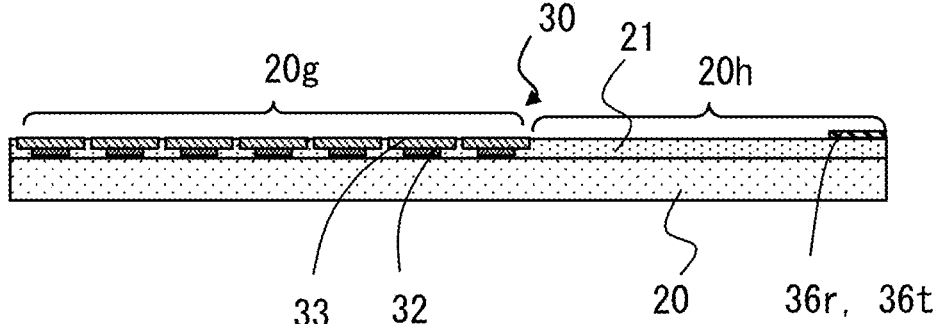
FIG. 5A is a schematic process cross-sectional view illustrating a method for manufacturing the radiation detector.

A plurality of pixels each including a switching element and a photoelectric conversion element are formed on the substrate. As illustrated in FIG. 5A, the substrate 20 is prepared to form the pixel array 30 with the first main surface 20a including the plurality of pixels 31. To be specific, for example, a semiconductor manufacturing technique to be used for a liquid crystal display device is used to form the plurality of TFTs 32 in the pixel region 20g of the first main surface 20a of the substrate 20. Further, a plurality of the photodiodes 33 respectively connected to the plurality of TFTs 32 are formed. Simultaneously of the formation of the pixel array 30, the plurality of scanning lines 34 and data lines 35 connected to the TFTs 32, the pad 36t connected to the scanning line 34, and the pad 36r connected to the data line 35 are formed.

Thereafter, in a case where the substrate 20 is an aggregate substrate corresponding to a plurality of the radiation detectors 101, the substrate 20 is divided to have the size of the substrate of each of the radiation detectors 101.

(B) A Step of Acquiring Inspection Image Data (S2)

Figure 5B:
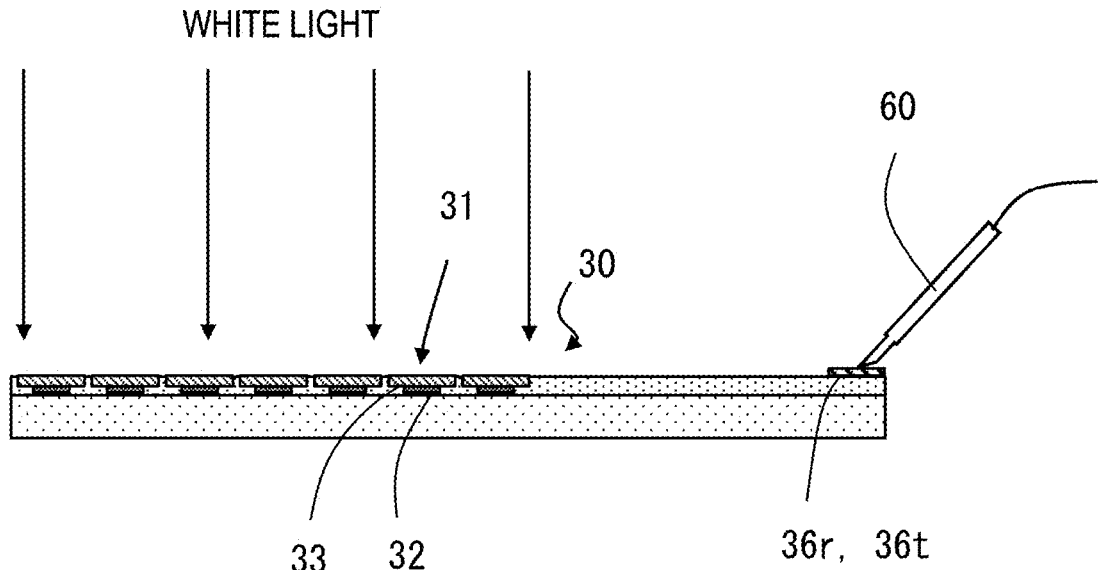
FIG. 5B is a schematic process cross-sectional view illustrating the method for manufacturing the radiation detector.
Figure 5C:
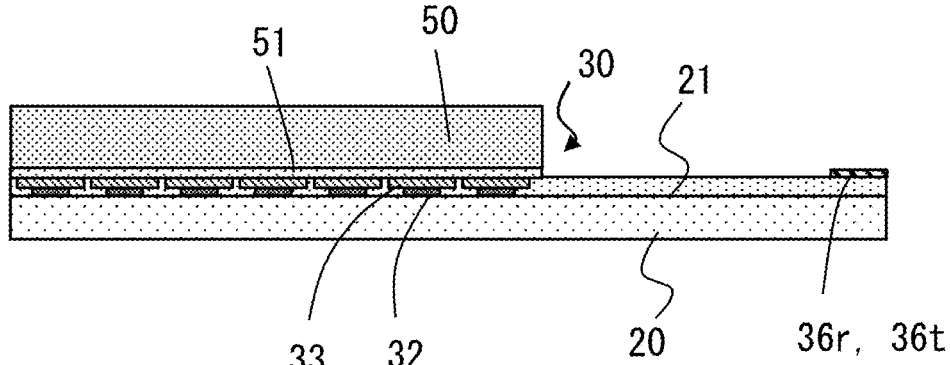
FIG. 5C is a schematic process cross-sectional view illustrating the method for manufacturing the radiation detector.
Figure 5D:
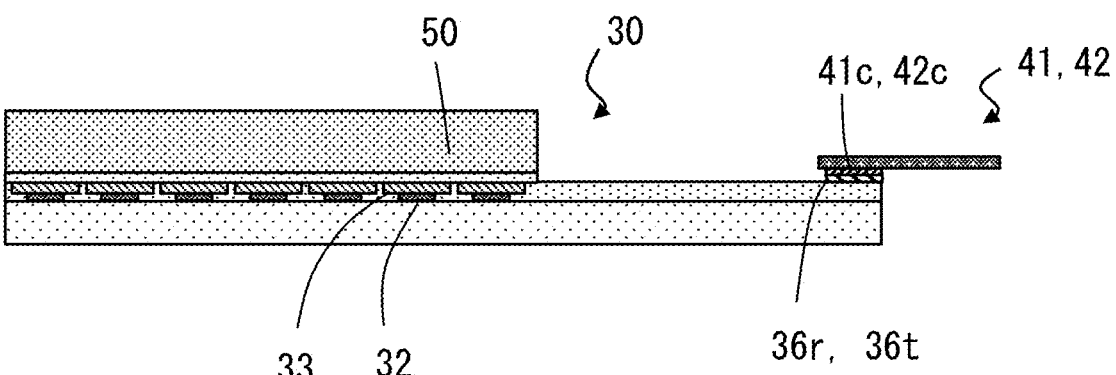
FIG. 5D is a schematic process cross-sectional view illustrating the method for manufacturing the radiation detector.

The plurality of pixels 31 are irradiated with visible light to obtain inspection image data from the plurality of pixels 31. Such a step is executed as a part of a step of inspecting the pixels 31 for a defect. First, as illustrated in FIG. 5B, the pixel array 30 is driven, a defect inspection device for the pixel array 30 is prepared in order to detect generated charges, and a probe pin 60 is brought into contact with the pad 36t and the pad 36r. Next, the plurality of pixels 31 are irradiated with visible light, the pixels 31 are sequentially selected by applying a voltage to the pad 36t, and the charges accumulated in the photodiode of the selected pixels 31 are read out by the defect inspection device via the pad 36r. Example of the visible light to be irradiated may include white light.

The defect inspection device detects the read charge amount of each pixel as, for example, a voltage, performs A/D conversion to generate inspection image data of a luminance value, and temporarily stores such inspection image data. The quality of each pixel is determined based on the stored inspection image data. For example, if the luminance value is equal to or less than a predetermined value, the pixel is considered not to operate correctly, and thus, the defect inspection device determines that such a pixel is defective. The defect inspection device counts the number of pixels determined to be defective (hereinafter referred to as defective pixels), and if the number of defective pixels is smaller than a predetermined value, determines that the inspected radiation detector 101 is non-defective.

(C) A Step of Writing Image Data into Storage Device (C3)

The inspection image data of the radiation detector 101 determined to be non-defective is written into the storage device 43. For example, a writing device that can write data into the storage device 43 is prepared, and the storage device 43 is loaded into the writing device. The writing device receives the inspection image data of the radiation detector 101 from the defect inspection device and writes the received inspection image data into the storage device 43. The defect inspection device may temporarily store position information of the defective pixel, and the writing device may further write the stored position information of the defective pixel into the storage device 43.

(D) A Step of Forming Scintillators (S4)

The scintillator 50 is formed on the plurality of pixels 31. As described above, the scintillator 50 is bonded onto the plurality of pixels 31 using the adhesive layer 51 such as OCA. Alternatively, the scintillator 50 may be formed by using a thin film formation technique.

(E) A Step of Mounting Storage Device on Substrate (S5)

The storage device 43 into which the image data is written is mounted on the substrate 20. The driver IC including the scanning line drive unit 42 and the charge detection unit 41 and the storage device 43 are mounted in the peripheral region 20*h* of the substrate 20. Solder, conductive paste, or the like can be used for mounting. Thus, the radiation detector 101 is completed.

(F) A Step of Incorporation into Housing (S6)

Figure 6:
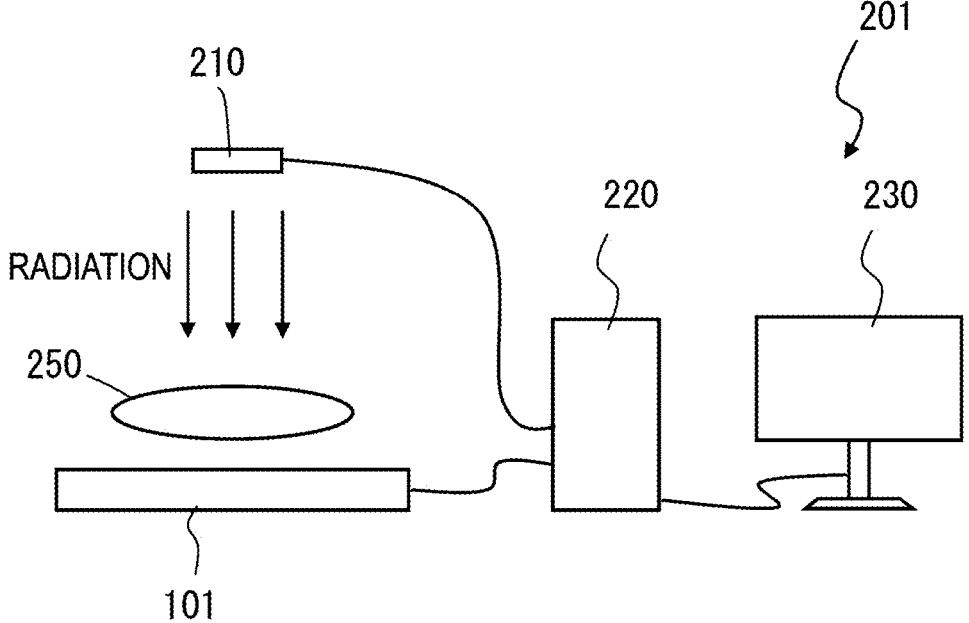
FIG. 6 is a schematic diagram illustrating a configuration of a radiation imaging system used in an imaging method according to the present embodiment.
Figure 7:
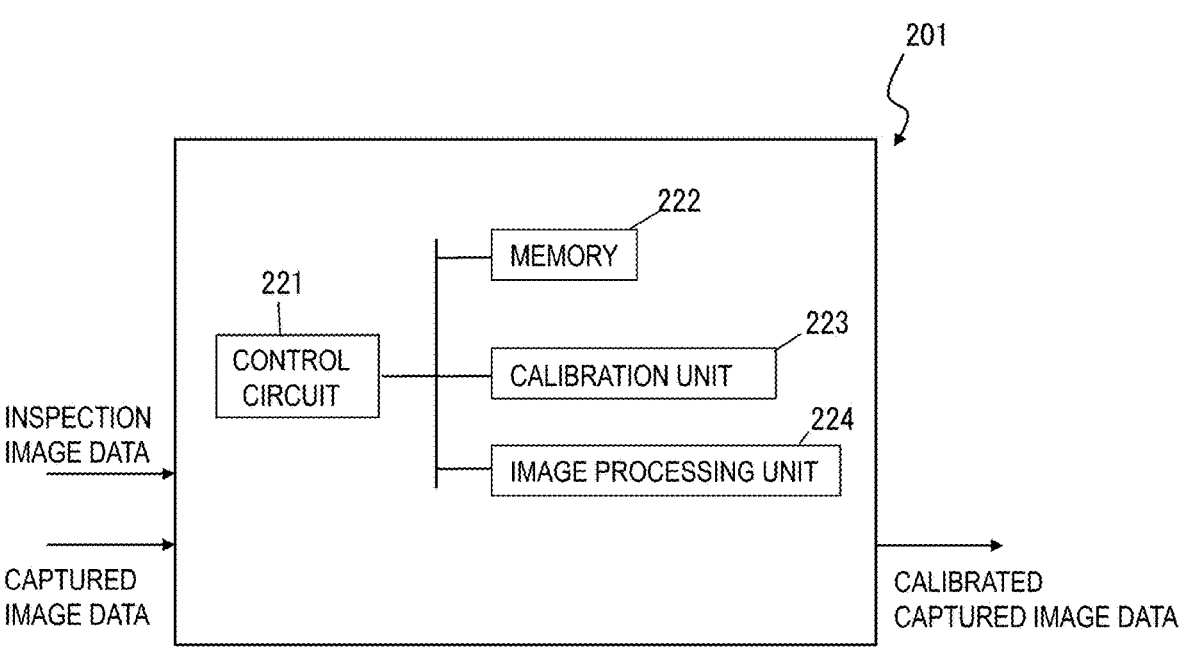
FIG. 7 is a block diagram illustrating a configuration example of a control device 220.

If necessary, the radiation detector 101 is incorporated into a housing. Thus, the radiation FPD is completed.
Imaging Method Next, an imaging method according to the first embodiment will be described. FIG. 6 is a schematic diagram illustrating a configuration of a radiation imaging system 201 used in an imaging method according to the first embodiment. The radiation imaging system 201 includes the above-described radiation detector 101, a radiation source 210, a control device 220, and a monitor 230. FIG. 7 is a block diagram illustrating a configuration example of the control device 220. First, the configuration of the radiation imaging system 201 will be described.

The radiation source 210 emits radiation passing through a subject. For example, the radiation source 210 emits X-rays. The control device 220 includes a control circuit 221, a memory 222, a calibration unit 223, and an image processing unit 224. The memory 222 stores the inspection image data stored in the storage device 43 of the radiation detector 101. The memory 222 stores captured image data obtained by detecting radiation passed through by the radiation detector 101 when the radiation is emitted from the radiation source 210 toward a subject. For example, the radiation detector 101 includes pixels arranged in a matrix of r rows and s columns, and the luminance value of each pixel of the captured image data is represented by $S_{r, s}$ (r=0, 1, 2, . . . , s=0, 1, 2).

The calibration unit 223 receives the inspection image data stored in the memory 222 and generates calibration data from the inspection image data. The inspection image data is configured by the luminance value of each pixel, and ideally, the luminance values of non-defective pixels are the same. However, due to variations in the thicknesses of the insulating layer and the semiconductor layer, the exposure condition of photolithography, the temperature condition of heat treatment, and the like at the time of manufacturing the radiation detector 101, variations also occur in the luminance value of each pixel. Thus, the use of the inspection image data is considered to make it possible to suppress the brightness unevenness in the captured image caused by such variations.

The variation in the luminance value of the inspection image data is considered to be proportional to the detected charge amount, and thus, for example, if such a variation is standardized to create calibration data and the captured image is corrected using such calibration data, the brightness unevenness in the captured image can be suppressed.

For example, the luminance value of each pixel of the inspection image data is represented by $I_{r, s}$. The calibration unit 223 calculates an average value $I_{av}$ of the luminance of all pixels of the inspection image data, and further obtains $I_{r, s}/I_{av}$ for all the pixels. Such a value indicates the distribution of the sensitivity of each pixel, and thus, the inverse number of such a calculated value, that is, $C_{r, s}=I_{r, s}$, is calculated as the calibration coefficient $C_{r, s}$. If the storage device 43 also stores the position information of the defective pixel, the calibration unit 223 may exclude the luminance value of the defective pixel in calculating the average value $I_{av}$ of the luminance of all the pixels.

The image processing unit 224 receives the captured image data $S_{r, s}$ from the memory 222 and receives the calibration coefficient $C_{r, s}$ from the calibration unit 223. The image processing unit 224 multiplies the captured image data $S_{r, s}$ by the calibration coefficient $C_{r, s}$ to generate calibrated captured image data $S'_{r, s}$. The generated calibrated captured image data $S'_{r, s}$ is output to the monitor 230. The calibrated captured image data $S'_{r, s}$ may be stored in the memory 222.

As described above, the brightness unevenness in the captured image data is caused by the process during manufacturing the active matrix substrate 10. Therefore, as long as the characteristics of the active matrix substrate 10 do not change due to, for example, aged deterioration, brightness unevenness is considered to be appropriately suppressed by using the same calibration coefficient $C_{r, s}$ stored in the storage device 43. In this sense, it can be said that the calibration coefficient $C_{r, s}$ obtained from the inspection image data is used to calibrate the brightness unevenness unique to each active matrix substrate 10 in the captured image.

When the storage device 43 also stores the position information of the defective pixel, the image processing unit 224 may obtain the luminance value of the defective pixel by interpolation. Specifically, values of the captured image data $S'_{r, s}$ of the pixels surrounding the defective pixel, for example, four pixels adjacent in the row and column directions, of the calibrated captured image data $S'_{r, s}$, may be totaled and divided by four to evaluate the luminance value of the defective pixel.

Figure 8:
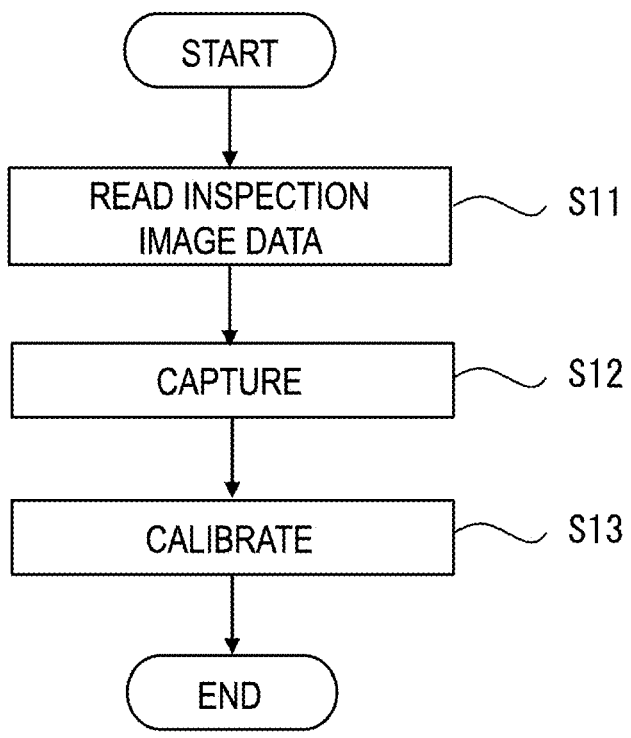
FIG. 8 is a flowchart illustrating an imaging method according to the first embodiment.

Next, an imaging method using the radiation imaging system 201 will be described. FIG. 8 is a flowchart illustrating the imaging method according to the first embodiment. The imaging method according to the first embodiment includes a step of reading the inspection image data or the calibration parameter from the storage device (S11), a step of capturing a subject with radiation (S12), and a step of calibrating the image data of the subject (S13).

(A) A Step of Reading Inspection Image Data or Calibration Parameter from Storage Device (S11)

First, in the radiation imaging system 201, the inspection image data $I_{r, s}$ is read out from the storage device 43 of the radiation detector 101 and stored in the memory 222 of the control device 200. As described above, the inspection image data or the calibration parameter is acquired in advance by irradiating the plurality of pixels with visible light during manufacture of the radiation detector 101. Such inspection image data is used to determine the defect of each pixel.

Subsequently, the calibration unit 223 evaluates the calibration coefficient $C_{r, s}$ using the inspection image data.

(B) A Step of Capturing Subject with Radiation (S12)

The radiation detector 101 is arranged so as to be positioned behind a subject with respect to the radiation source 210, and the radiation is emitted from the radiation source 210 toward the subject. The radiation detector 101 detects the radiation transmitted through the subject, and the obtained image data of the subject is transmitted to the control device 220.

(C) A Step of Calibrating Image Data of Subject (S13)

The image processing unit 224 receives the captured image data $S_{r, s}$ of the subject from the radiation detector 101, and receives the calibration coefficient $C_{r, s}$ from the calibration unit 223. The image processing unit 224 generates calibrated captured image data $S'_{r, s}$ as a radiation image by multiplying the captured image data $S_{r, s}$ by the calibration coefficient $C_{r, s}$, and outputs the radiation image to the monitor 230.

Figure 9:
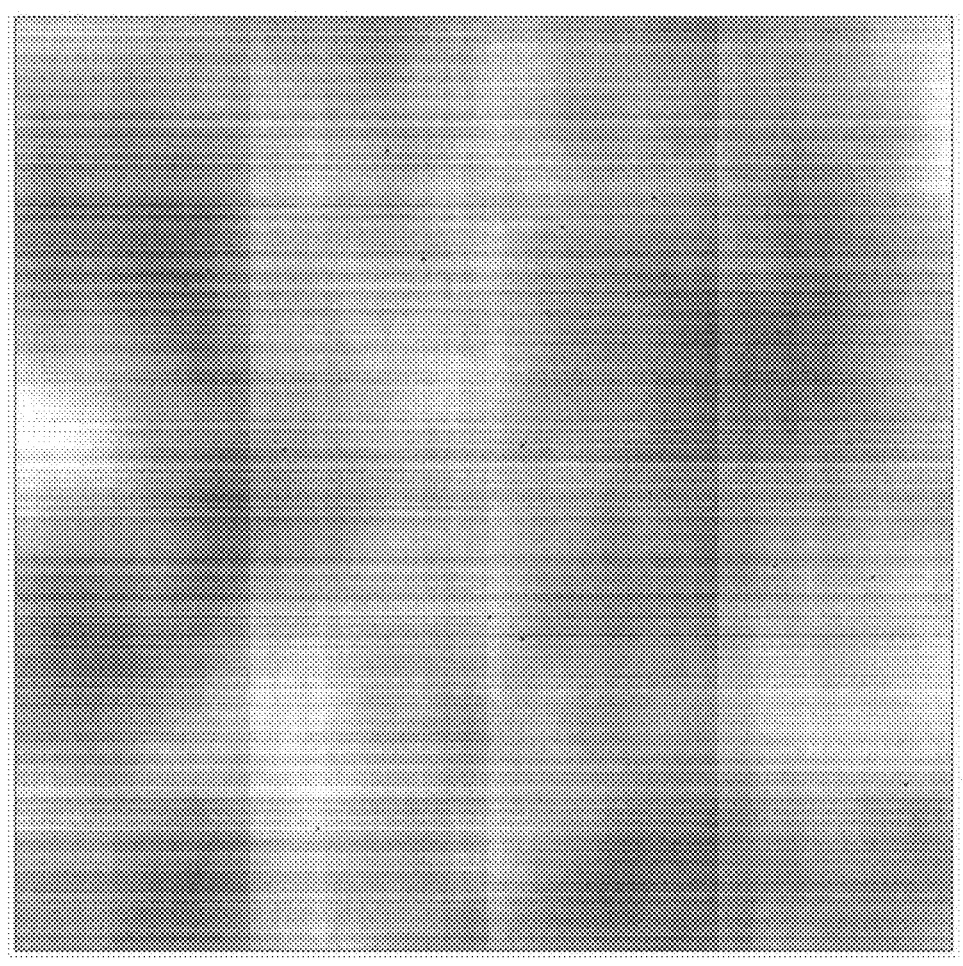
FIG. 9 is a schematic diagram illustrating an example of an inspection image.

FIG. 9 schematically illustrates an example of the inspection image data stored in the storage device 43. In FIG. 9, the density of black and white represents the luminance value, and the whiter the color, the higher the luminance value. In FIG. 9, shading is emphasized for ease of understanding. As illustrated in FIG. 9, a distribution of shading is observed.

Figure 10:
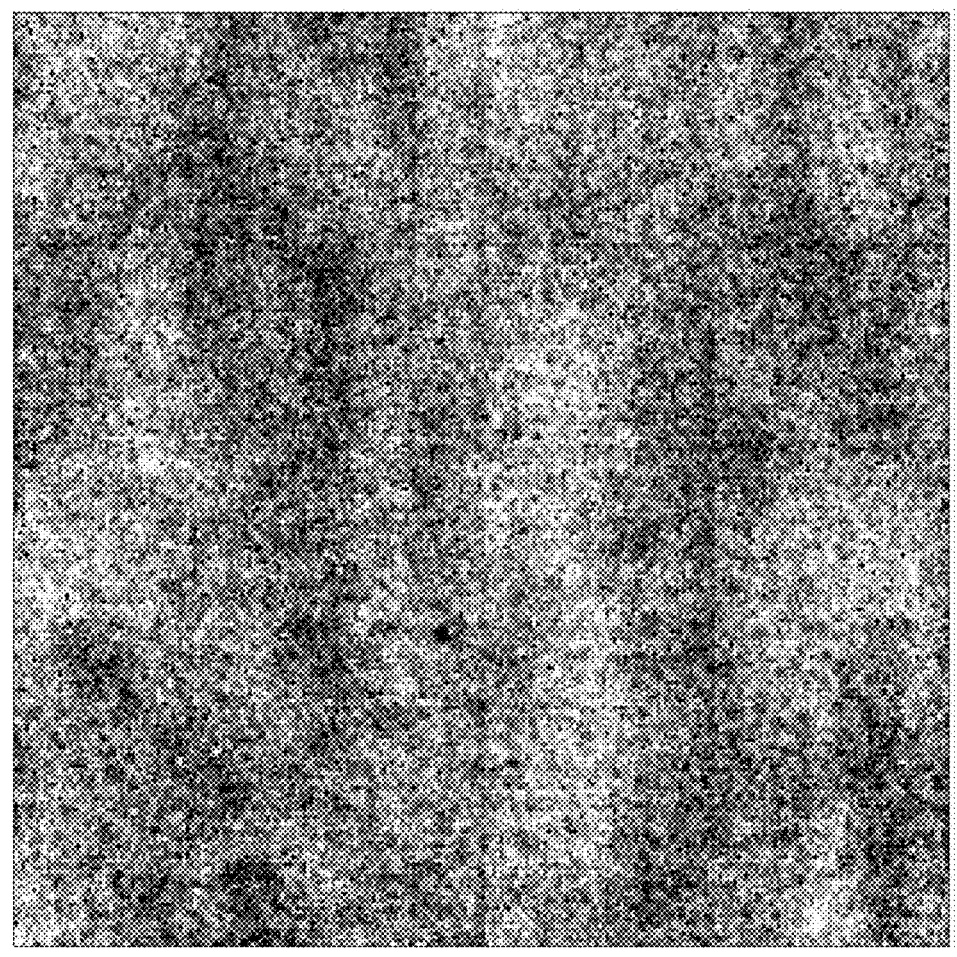
FIG. 10 is a schematic diagram illustrating an example of a captured image obtained through radiation imaging without placing a subject.

FIG. 10 schematically illustrates an example of a captured image obtained through radiation imaging without placing a subject. As can be seen from FIG. 10, the brightness unevenness is observed over the entire area.

Figure 11:
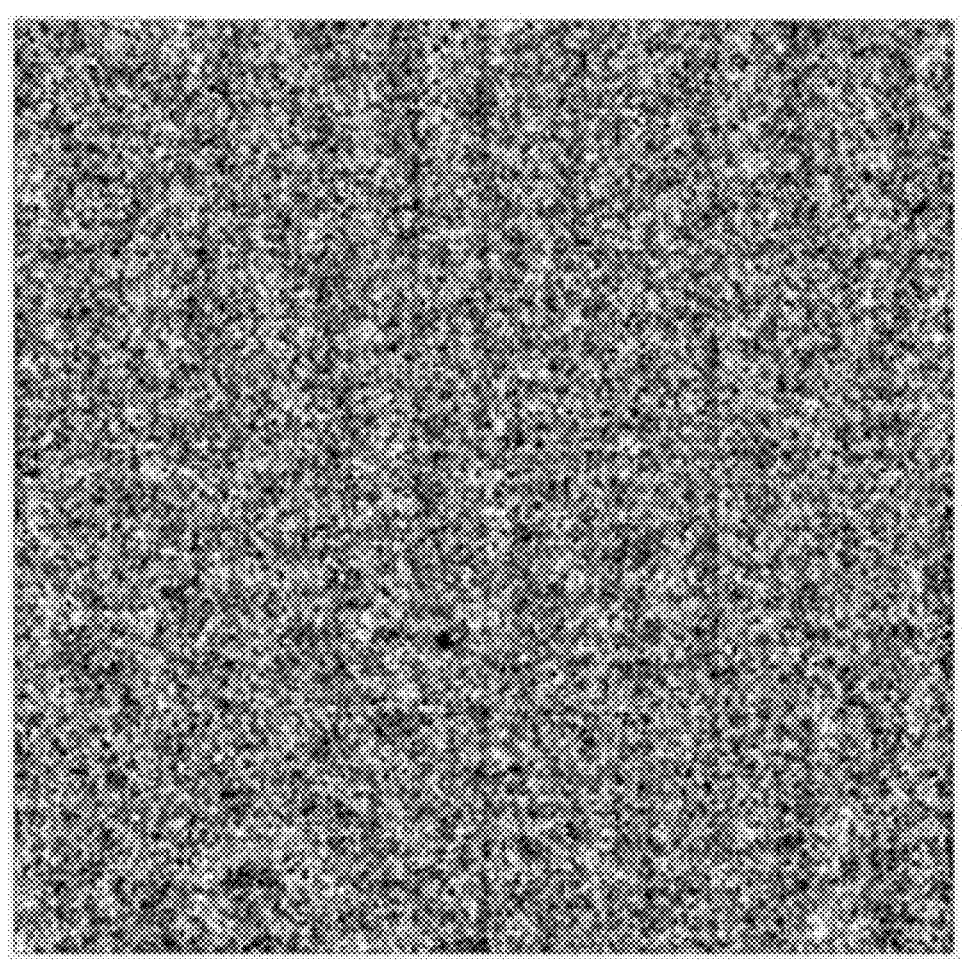
FIG. 11 is a schematic diagram illustrating an example of a calibrated captured image.

FIG. 11 schematically illustrates an example of the calibrated captured image data obtained by calibrating the captured image data with a calibration coefficient obtained from the inspection image data. Random luminance variations are observed as a whole; however, local brightness unevenness as illustrated in FIG. 10 is suppressed.

Thus, in the radiation detector, the method for manufacturing the radiation detector, and the imaging method according to the first embodiment, the inspection image data for pixel defect inspection performed during the manufacturing of the radiation detector is used to suppress the brightness unevenness. The irradiation with radiation is unnecessary, and thus, it is not necessary to prepare and manage radiation equipment, and it is also not necessary to arrange a worker who handles radiation. In these respects, according to the first embodiment, the brightness unevenness of the radiation detector can easily be suppressed. On the other hand, for example, according to the technique disclosed in JP 2000-278607 A, a reference subject and irradiation with X-rays are necessary.

The inspection image data for the pixel defect inspection is used to suppress the brightness unevenness, and thus, it is not necessary to separately measure the brightness unevenness, and the manufacturing cost can be reduced and the manufacturing time can be shortened.

Further, the radiation detector holds the inspection image data, and thus, for example, even when the radiation detector is used in another radiation imaging system, the brightness unevenness can appropriately be suppressed.

Second Embodiment

In the first embodiment, the inspection image data itself is stored in the storage device. The inspection image data includes luminance values of all pixels, and thus, the amount of data is relatively large. Therefore, the capacity of the storage device that stores the inspection image data also increases.

A radiation detector, a method for manufacturing the radiation detector, and an imaging method according to a second embodiment differ from the first embodiment in that the calibration parameter based on inspection image data, rather than inspection image data, is stored in the storage device.

Specifically, the calibration parameter may be a characteristic value of a filter that passes a predetermined band of spatial frequencies included in the inspection image data. For example, when the brightness unevenness included in the inspection image has periodicity, a Fourier transform (for example, a fast Fourier transform) may be performed on the inspection image data for analysis, and as a result, a filter that can suppress the brightness unevenness can be selected. From among a low-pass filter, a high-pass filter, and a band-pass filter, the type of filter that can most effectively suppress the brightness unevenness and a cutoff frequency, which is the characteristic value of the filter, are determined, and the determined cutoff frequency is stored in the storage device 43 as a calibration parameter.

In this case, first, in the radiation imaging system 201, the calibration parameter is read from the storage device 43 of the radiation detector 101 and stored in the memory 222 of the control device 200. Next, a subject is irradiated with radiation to acquire the captured image data of the subject, and such captured image data is transmitted to the control device 220.

The image processing unit 224 of the control device 220 performs a Fourier transform on the captured image data of the subject, and performs filtering on the obtained data by using the filter stored as the calibration parameter. Thereafter, the obtained data is subjected to inverse Fourier transform to obtain data of a radiation image which is the calibrated image data of the subject.

According to the second embodiment, the data amount of the calibration parameter is small, and thus, it suffices that the capacity of the storage device 43 is small. Therefore, for example, it is easy to incorporate the storage device 43 into a driver IC such as the charge detection unit 41 or the scanning line drive unit 42.

Third Embodiment

In the first embodiment, the storage device 43 is arranged in the radiation detector. On the other hand, a radiation detector, a method for manufacturing the radiation detector, and an imaging method according to a third embodiment differs from the first embodiment in that the storage device is located in an external device different from the radiation detector 101.

Specifically, the storage device may be, for example, an independent storage medium such as an SD card, a USB memory, or an optical disk independent of the radiation detector. Alternatively, the storage device may be included in a server of a manufacturer that manufactures the radiation detector, a cloud server, or the like.

When the storage device is an independent storage medium, the inspection image data is recorded in the storage medium by using a writing device suitable for the storage medium during the pixel defect inspection. The control device 200 of the radiation imaging system 201 is provided with an interface that can read the inspection image data from the storage medium to read such inspection image data from the storage medium.

Further, when the storage device is included in the server, the obtained inspection image data is stored in a storage device of the server during the pixel defect inspection. Thereafter, before the imaging is performed using the radiation imaging system 201, the inspection image data is read out from the server to the control device 200 of the radiation imaging system 201 via a communication line or the like.

According to the third embodiment, the inspection image data is stored in the server, and thus, for example, even when the radiation detector is used in another radiation imaging system, the inspection image data may be acquired from the other radiation imaging system by using a communication line such as the Internet, and appropriately suppress the brightness unevenness.

Fourth Embodiment

In the first embodiment, in the control device 200 of the radiation imaging system 201, the captured image data captured by using the radiation is calibrated by using the inspection image data. However, the control device 200 may be provided in the radiation detector. That is, the radiation detector according to a fourth embodiment differs from that of the first embodiment in that the radiation detector further includes the control device 200.

When the radiation detector includes the control device 200, before the first imaging, the control device 200 obtains the calibration coefficient $C_{r, s}$ from the inspection image data in the radiation detector, as described in the first embodiment.

When a subject is captured using radiation, the control device 200 calibrates the captured image data $S_{r, s}$ of the subject with the calibration coefficient $C_{r, s}$, and outputs the calibrated captured image data $S'_{r, s}$ as a radiation image to the outside.

According to the fourth embodiment, the calibrated captured image data is output from the radiation detector. Thus, the radiation imaging system according to the fourth embodiment other than the radiation detector may be configured in much the same way as the known radiation imaging system. Therefore, in the radiation detector according to the fourth embodiment, the brightness unevenness is suppressed and excellent versatility is provided.

Other Embodiments

A radiation detector, a method for manufacturing the radiation detector, and an imaging method according to the disclosure may be modified in various ways in addition to the above embodiments. For example, the second embodiment and the third embodiment may be combined. In the above embodiments, the inspection image data is acquired for each screen in the defect inspection, but a plurality of defect inspections may be performed, and an average value of the inspection image data acquired from the plurality of defect inspections may be stored in the storage device.

The radiation detector, a method for manufacturing the radiation detector, and an imaging method according to the disclosure may be described as follows.

A radiation detector according to a first configuration includes a substrate, a plurality of pixels arranged on the substrate, the plurality of pixels each including a switching element and a photoelectric conversion element, a scintillator arranged to cover the photoelectric conversion element of each of the plurality of pixels, and a storage device configured to store inspection image data acquired by irradiating the plurality of pixels with visible light before forming the scintillator or a calibration parameter based on the inspection image data.

According to the radiation detector of the first configuration, brightness unevenness of the radiation detector can easily be suppressed without using radiation. The inspection image data for the pixel defect inspection is used to suppress the brightness unevenness, and thus, it is not necessary to separately measure the brightness unevenness, and the manufacturing cost can be reduced and the manufacturing time can be shortened.

In a second configuration according to the first configuration, the storage device may store the inspection image data and the inspection image data may be luminance data. In a third configuration according to the first configuration, the storage device may store the calibration parameter and the calibration parameter may be a characteristic value of a filter that passes a predetermined band of spatial frequencies included in the inspection image data.

A fourth configuration according to any one of the first to third configurations may further include a driver IC configured to drive a plurality of pixels, in which the driver IC may include a storage device.

A fifth configuration according to the first configuration further includes a control device, in which the control device may receive inspection image data or a calibration parameter from the storage device, and may calibrate image data of a subject obtained by irradiating the radiation detector with radiation through the subject by using the inspection image data or the calibration parameter.

A method for manufacturing a radiation detector according to a sixth configuration includes forming a plurality of pixels each including a switching element and a photoelectric conversion element, on a substrate, irradiating the plurality of pixels with visible light to acquire inspection image data from the plurality of pixels, writing inspection image data or a calibration parameter based on the inspection image data into a storage device, and mounting the storage device configured to store the inspection image data written therein, on the substrate.

According to the radiation detector of the sixth configuration, brightness unevenness of the radiation detector can easily be suppressed without using radiation. The inspection image data for the pixel defect inspection is used to suppress the brightness unevenness, and thus, it is not necessary to separately measure the brightness unevenness, and the manufacturing cost can be reduced and the manufacturing time can be shortened.

In a seventh configuration according to the sixth configuration, the storage device may store the inspection image data and the inspection image data may be luminance data.

In an eighth configuration according to the sixth configuration, the storage device may store the calibration parameter and the calibration parameter may be a characteristic value of a filter that passes a predetermined band of spatial frequencies included in the inspection image data.

In a ninth configuration according to any one of the sixth to eighth configurations, the storage device may be included in the driver IC that drives the plurality of pixels, and the mounting may include mounting the driver IC on the substrate.

In a tenth configuration according to any one of the sixth to ninth configurations, determining quality of the plurality of pixels by using the inspection image data may be further included between the acquiring and the writing.

In an eleventh configuration according to any one of the sixth to tenth configurations, arranging a scintillator covering the plurality of pixels may be further included between the acquiring and the writing.

An imaging method according to a twelfth configuration is an imaging method for acquiring a radiation image by using a radiation detector including a substrate, a plurality of pixels arranged on the substrate, the plurality of pixels each including a switching element and a photoelectric conversion element, and a scintillator arranged to cover the photoelectric conversion element of each of the plurality of pixels, and a storage device configured to store inspection image data previously acquired by irradiating the plurality of pixels with visible light, during manufacture of the radiation detector, or a calibration parameter based on the inspection image data, the imaging method including reading the inspection image data or the calibration parameter from the storage device, irradiating the radiation detector with radiation through a subject to acquire image data of the subject, and calibrating image data of the subject by using the inspection image data or the calibration parameter to acquire the radiation image.

According to the radiation detector of the twelfth configuration, brightness unevenness of the radiation detector can easily be suppressed without using radiation. The inspection image data for the pixel defect inspection is used to suppress the brightness unevenness, and thus, it is not necessary to separately measure the brightness unevenness, and the manufacturing cost can be reduced and the manufacturing time can be shortened.

In a thirteenth configuration according to the twelfth configuration, the radiation detector may include a storage device.

In a fourteenth configuration according to the twelfth configuration, the storage device may be independent of the radiation detector, and before image data of the subject is acquired, the inspection image data or the calibration parameter may be transmitted from the storage device to a radiation device that emits the radiation.

INDUSTRIAL APPLICABILITY

A radiation detector and a method for manufacturing the radiation detector of the disclosure may be suitably utilized in various fields and suitably used on a medical radiation FPD and the like.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A radiation detector comprising:
a substrate;
a plurality of pixels arranged on the substrate, the plurality of pixels each including a switching element and a photoelectric conversion element;
a scintillator arranged to cover the photoelectric conversion element of each of the plurality of pixels; and
a storage device configured to store inspection image data acquired by irradiating the plurality of pixels with visible light before forming the scintillator or a calibration parameter based on the inspection image data.

2. The radiation detector according to claim 1, wherein the storage device stores the inspection image data, and the inspection image data is luminance data.

3. The radiation detector according to claim 1, wherein the storage device stores the calibration parameter, and the calibration parameter is a characteristic value of a filter that passes a predetermined band of spatial frequencies included in the inspection image data.

4. The radiation detector according to claim 1, further comprising:
a driver IC configured to drive the plurality of pixels, wherein the driver IC includes the storage device.

5. The radiation detector according to claim 1, further comprising:
a control device,
wherein the control device
receives the inspection image data or the calibration parameter from the storage device, and
calibrates image data of a subject acquired by irradiating the radiation detector with radiation through the subject by using the inspection image data or the calibration parameter.

6. A method for manufacturing a radiation detector, comprising:
forming a plurality of pixels each including a switching element and a photoelectric conversion element, on a substrate;
irradiating the plurality of pixels with visible light to acquire inspection image data from the plurality of pixels;
writing the inspection image data or a calibration parameter based on the inspection image data into a storage device; and
mounting the storage device configured to store the inspection image data written therein, on the substrate.

7. The method for manufacturing a radiation detector, according to claim 6,
wherein the storage device stores the inspection image data, and
the inspection image data is luminance data.

8. The method for manufacturing a radiation detector, according to claim 6,
wherein the storage device stores the calibration parameter, and
the calibration parameter is a value of a filter that passes a predetermined band of spatial frequencies included in the inspection image data.

9. The method for manufacturing a radiation detector, according to claim 6,
wherein the storage device is included in a driver IC that drives the plurality of pixels, and
the mounting includes mounting the driver IC on the substrate.

10. The method for manufacturing a radiation detector, according to claim 6, further comprising:
determining quality of the plurality of pixels by using the inspection image data between the acquiring and the writing.

11. The method for manufacturing a radiation detector, according to claim 6, further comprising:
arranging a scintillator covering the plurality of pixels between the acquiring and the writing.

12. An imaging method for acquiring a radiation image by using a radiation detector including
a substrate,
a plurality of pixels arranged on the substrate, the plurality of pixels each including a switching element and a photoelectric conversion element, and
a scintillator arranged to cover the photoelectric conversion element of each of the plurality of pixels, and
a storage device configured to store inspection image data previously acquired by irradiating the plurality of pixels with visible light, during manufacture of the radiation detector, or a calibration parameter based on the inspection image data, the imaging method comprising:

reading the inspection image data or the calibration parameter from the storage device, irradiating the radiation detector with radiation through a subject to acquire image data of the subject; and calibrating image data of the subject by using the inspection image data or the calibration parameter to acquire the radiation image.

13. The imaging method according to claim 12, wherein the radiation detector includes the storage device.

14. The imaging method according to claim 12, wherein the storage device is independent of the radiation detector, and before image data of the subject is acquired, the inspection image data or the calibration parameter is transmitted from the storage device to a radiation device that emits the radiation.

\* \* \* \* \*